Jan. 26, 1971   A. DAHLSTROM   3,557,631
SPEED REDUCING MECHANISM

Filed Jan. 2, 1969   3 Sheets-Sheet 1

INVENTOR
ARVID DAHLSTROM

BY *Richard T. Ludberg*
ATTORNEY

Jan. 26, 1971  A. DAHLSTROM  3,557,631
SPEED REDUCING MECHANISM
Filed Jan. 2, 1969  3 Sheets-Sheet 2

INVENTOR
ARVID DAHLSTROM
BY
ATTORNEY

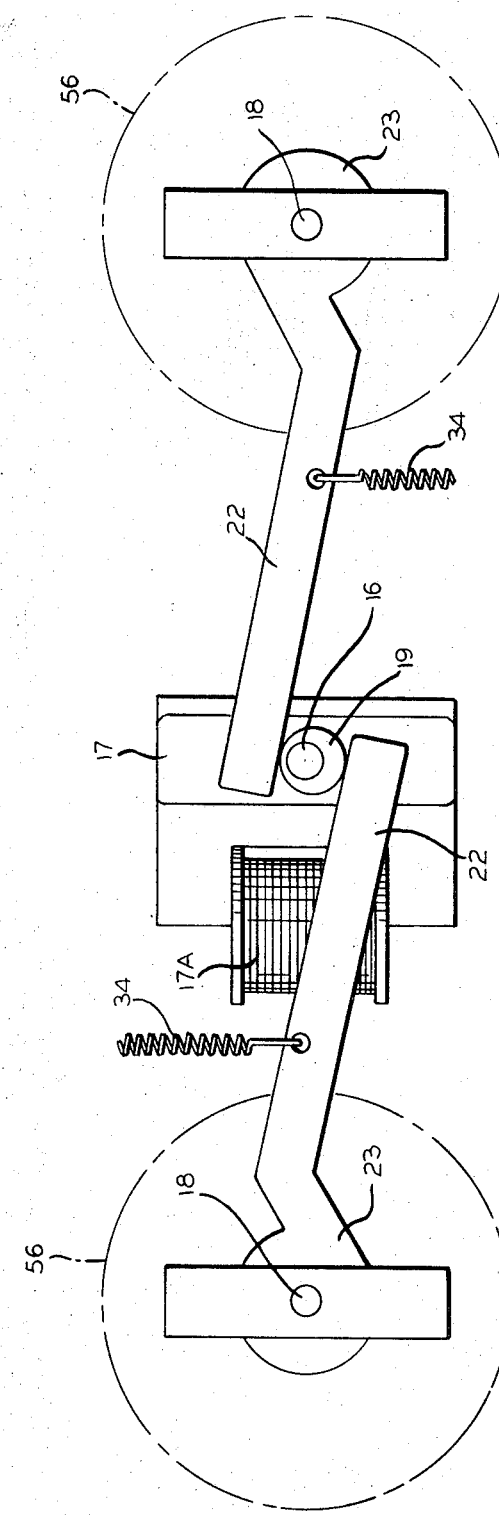

United States Patent Office 3,557,631
Patented Jan. 26, 1971

3,557,631
SPEED REDUCING MECHANISM
Arvid Dahlstrom, 1653 W. Carmen Ave.,
Chicago, Ill. 60640
Filed Jan. 2, 1969, Ser. No. 798,243
Int. Cl. F16h 27/10
U.S. Cl. 74—125.5      3 Claims

ABSTRACT OF THE DISCLOSURE

A speed reducing mechanism characterized by the absence of a gear train and comprising a driven shaft having an eccentric cooperating with a rock shaft connected through the medium of a one-way clutch to a driven shaft. In an embodiment of the invention the angular movement of the rock shaft can be varied from zero to a desired maximum. In a further embodiment of the invention the single drive shaft operates a pair of rock shafts each in turn connected through one-way clutch means to a driven shaft.

---

With the foregoing considerations in mind it is a principal object of the invention to provide an improved speed reducing mechanism characterized by the absence of a gear train.

Another object is to provide a speed reducing mechanism capable of variable adjustment from zero speed to maximum speed.

DRAWINGS

FIG. 10 is a plan view of another embodiment of the invention.

SPECIFICATION

Figure 1:
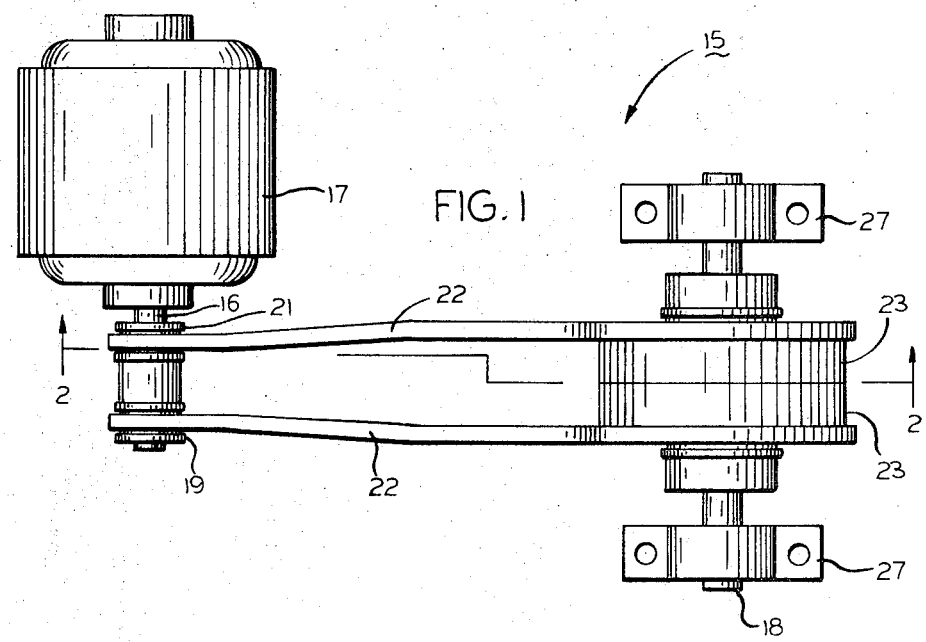
FIG. 1 is a plan view of a speed reducing mechanism embodying the improvements according to the present invention.
Figure 2:
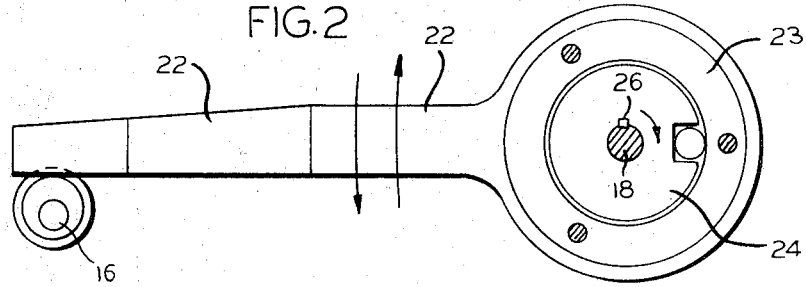
FIG. 2 is an elevational view looking in the direction of the arrows 2—2 of FIG. 1.

The improved speed reducing mechanism according to a first embodiment of the invention is denoted by the reference numeral 15 and includes a power shaft 16 driven by a prime mover 17 in the form of an electric motor. The latter is adapted by the structure according to the present invention to drive a driven shaft at a greatly reduced speed without the instrumentality of a gear train.

The speed reducing mechanism includes a pair of eccentrics 19 and 21 fast on the power shaft 16. These are phased 180° apart. Each eccentric is contacted by a rock arm 22 terminating in a clutching member 23 concentric with the driven shaft 18 and cooperating with a clutched member 24 fast by a key 26 to shaft 18.

The latter is supported in pillow blocks 27 at each end thereof. It will be understood that driven shaft 18 has a load, not shown, connected thereto, so that power is transmitted from prime mover 17 to driven shaft 18, the latter having a very small speed as compared to the speed of prime mover 17.

Figures 3, 4:
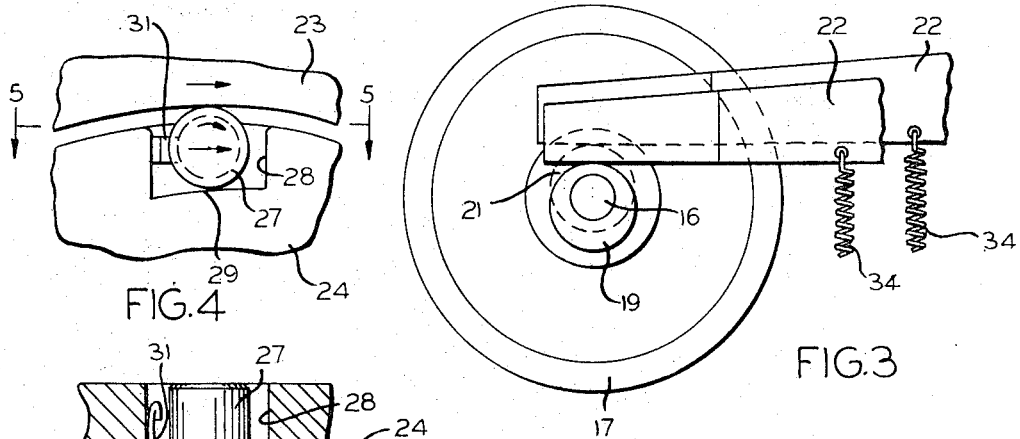
FIG. 3 is a detailed elevational view showing eccentrics mounted on a power shaft and rock arms cooperating therewith.
FIG. 4 is a detail of a one-way clutch employed with the structure of FIG. 1.
Figure 5:
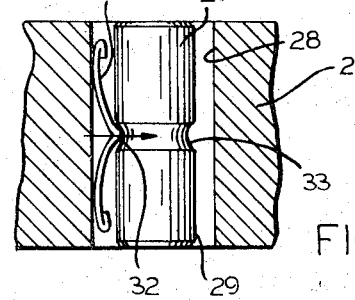
FIG. 5 is a view looking in the direction of the arrows 5—5 of FIG. 4.

The clutching connection between clutching member 23 and clutched member 24 is achieved by a roller sprag 27 held in a slot 28 in clutched member 24. Slot 28 has an inclined ramp surface 29 which is inclined as seen in FIG. 4. The pitch if the ramp surface 29 is exaggerated in FIG. 4, but clockwise movement of each rock arm 22 causes its clutching member 23 to roll the roller sprag 27 "up" the ramp surface to create a clutching connection with clutched member 24 by pinching roller sprag 27 between members 23 and 24.

Roller sprag 27 is additionally urged in a clutching direction by an leminiscate shaped spring 31 having its apex 32 engaged in an annular slot 33 in roller sprag 27.

On counter clockwise movement of arm 22 the clutching action is relieved. It will thus be seen that the two arms 22 alternate in their action to move driven shaft 18 through a small angle of rotation. The two arms and the clutches thus impart rotation to shaft 18 at a very small speed as compared to the speed of the power shaft 16.

Each rock shaft 22 is connected to a tension spring 34 in turn connected to a spring abutment, not shown, to hold the rock shafts 22 against their respective eccentrics 19 and 21.

Figure 6:
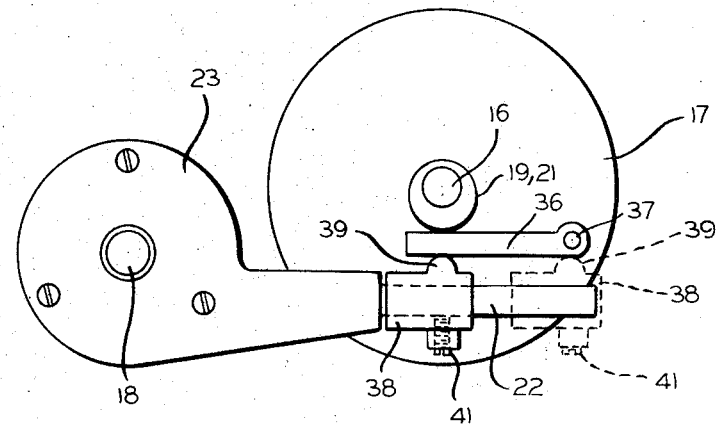
FIG. 6 is an elevation view showing mechanism for adjusting the speed reduction ratio.
Figure 7:
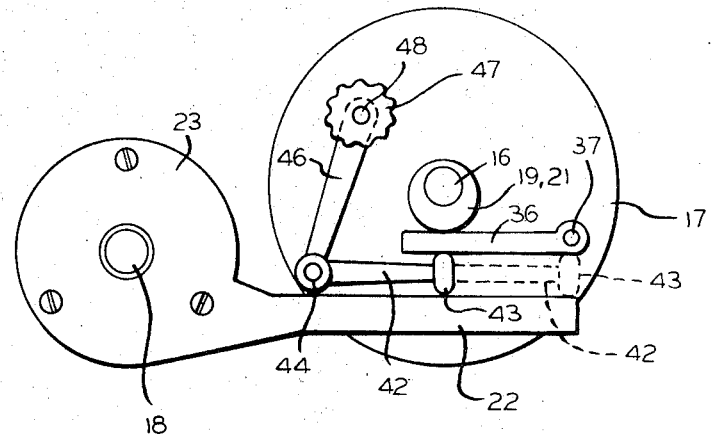
FIG. 7 is an elevation view showing another embodiment of mechanism for adjusting the speed reduction ratio.

Structure is provided for varying the speed reduction ratio, and as seen in FIGS. 6 and 7, an intermediate rock arm 36 is pivoted at 37 to the prime mover 17 and contacts the eccentrics 19 or 21 as the case may be.

In FIG. 6 rock arm 22 is provided with a slide 38 having a protuberance 39 thereon engageable with intermediate rock arm 36 through its length. The position of slide 38 on rock arm 22 is locked by a set screw 41 threaded thereinto. When protuberance 39 is opposite eccentric 19 or 21 the speed reduction ratio is smallest, the ratio increasing as the slide is opposite pivot point 37, when no motion is transmitted to driven shaft 18.

In FIG. 7 there is shown another arrangement for varying the speed reduction ratio. Parts common with the form seen in FIG. 6 are referred to by the same reference numeral. In this embodiment adjustment rod 42 having an arm contacting shoe 43 at the end thereof is movable between the positions shown to vary the speed reduction ratio in the manner seen with respect to FIG. 6.

Rod 42 is pivotally connected at 44 to an adjusting arm 46 which can be rocked to a desired setting by a control knob 47, arm 46 and knob 47 having a turning center at 48.

Figure 8:
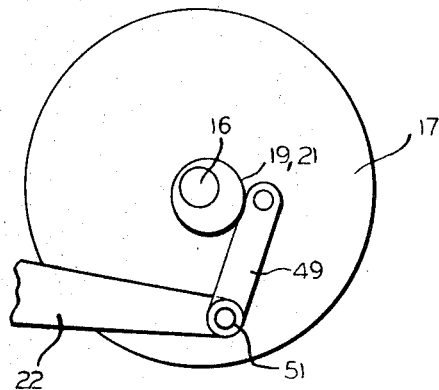
FIG. 8 is an alternative view of a rock arm.

Referring now to FIG. 8, there is shown an embodiment where the rock arm 22 contacts eccentric 19 or 21 through arm 49 rigidly connected at 51 to rock arm 22.

Figure 9:
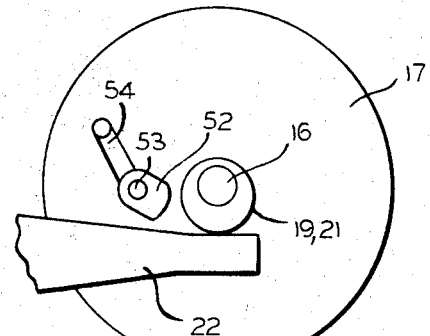
FIG. 9 is a view of mechanism for releasing driving connection with the speed reducing mechanism.

In FIG. 9 there is shown an arrangement whereby the driving connection between power shaft 16 and driven shaft 18 can be interrupted by throw out member 52 turning on shaft 53 by lever 54 to move member 52 against rock arm 22 to rock the same out of contact with eccentric 19 or 21.

In FIG. 10 there is shown a form of the invention especially suited for a moving advertising display. In this form of the invention the prime mover 17 may be in the form of a shaded pole motor having a driving coil 17A. In this form of the invention two driven shafts 18 are disposed on opposite sides of power shaft 16, each rock arm 22 having a clutching connection with a driven shaft in the manner previously described. Each driven shaft 18 may drive a turntable 56 or some other device having movement.

I claim:

1. In a speed reducer mechanism, a power shaft, a driven shaft, spaced from said power shaft, means for drivably connecting said power shaft to said driven shaft whereby said driven shaft is driven at a speed greatly less than the speed of said power shaft, said means comprising;
(a) an eccentric mounted on said power shaft;
(b) one-way clutch means including a clutched member mounted on said driven shaft;
(c) a rock arm extending between said power shaft and said driven shaft and cooperating with said eccentric, having a clutching member mounted thereon cooperating with said clutched member to rock said clutched member upon rocking movement in one direction of said rock arm and to impart an increment of angular movement to said driven shaft, and to release connection with said clutched member upon rocking movement in another direction;
(d) and means for varying the amplitude of movement of said rock arm to vary the increment of angular movement imparted to said clutched member comprising;
 (i) an intermediate rock arm having a fixed pivot point;
 (ii) said intermediate rock arm contacting said eccentric;
 (iii) a member movable along said first named rock arm and contacting said intermediate rock arm;
 (iv) said member being positionable along said first named rock arm at a point opposite said eccentric to give maximum angular movement to said first named rock arm, and being;
 (v) movable to a position opposite said fixed pivot point to give zero amplitude of movement to said first named rock arm.

2. A speed reducer according to amended claim 1 wherein said member is adjustably mounted on said first named rock shaft.

3. A speed reducer mechanism according to amended claim 1 wherein structure is provided for adjusting said member to positions between those of maximum and zero amplitude of said first named rock arm.

References Cited
UNITED STATES PATENTS

| | | | |
|---|---|---|---|
| 1,735,923 | 11/1929 | Helgeby | 74—116 |
| 2,384,110 | 9/1945 | Malmquist | 74—116 |
| 3,340,743 | 9/1967 | Stageberg | 74—116 |
| 3,447,391 | 6/1969 | Hargreaves et al. | 74—125.5 |

FRED C. MATTERN, Jr., Primary Examiner

W. S. RATLIFF, Jr., Assistant Examiner

U.S. Cl. X.R.

74—116